US012624746B2

(12) United States Patent
Cattoor et al.

(10) Patent No.: US 12,624,746 B2
(45) Date of Patent: May 12, 2026

(54) SYSTEMS AND METHOD FOR AN ELECTRIC POWERTRAIN

(71) Applicant: Dana Belgium N.V., Bruges (BE)

(72) Inventors: Kurt Cattoor, Koolkerke (BE); Filip D. Schacht, Meulebeke (BE); Joachim Van Dingenen, Drongen (BE)

(73) Assignee: DANA BELGIUM, Bruges (BE)

( * ) Notice: Subject to any disclaimer, the term of this patent is extended or adjusted under 35 U.S.C. 154(b) by 60 days.

(21) Appl. No.: 18/668,965

(22) Filed: May 20, 2024

(65) Prior Publication Data

US 2025/0060023 A1      Feb. 20, 2025

Related U.S. Application Data

(60) Provisional application No. 63/519,492, filed on Aug. 14, 2023.

(51) Int. Cl.
F16H 3/093          (2006.01)
B60K 1/02           (2006.01)
F16H 3/12           (2006.01)

(52) U.S. Cl.
CPC .............. F16H 3/093 (2013.01); B60K 1/02 (2013.01); F16H 3/12 (2013.01); *F16H 2200/0021* (2013.01); *F16H 2200/0043* (2013.01)

(58) Field of Classification Search
CPC .... F16H 3/093; F16H 3/12; F16H 2200/0021; F16H 2200/0043; B60K 1/02
See application file for complete search history.

(56) References Cited

U.S. PATENT DOCUMENTS

| | | | |
|---|---|---|---|
| 3,645,147 A | 2/1972 | Fodrea | |
| 4,963,313 A | 10/1990 | Noddin et al. | |
| 7,654,073 B2 | 2/2010 | Primlani | |
| 7,798,931 B2 | 9/2010 | Earhart | |
| 2023/0234433 A1 * | 7/2023 | Bigi | B60K 6/48 |
| | | | 180/69.6 |

FOREIGN PATENT DOCUMENTS

| | | | | | |
|---|---|---|---|---|---|
| CN | 101526123 A | * | 9/2009 | ............. | F16H 3/006 |
| CN | 105966219 B | | 8/2018 | | |
| DE | 19932118 C1 | * | 10/2000 | ............. | B60K 17/04 |
| DE | 102011008983 A1 | | 7/2012 | | |
| DE | 102011084623 A1 | | 4/2013 | | |
| DE | 102015010331 A1 | * | 2/2017 | ........... | F16H 37/021 |

(Continued)

*Primary Examiner* — William C Joyce
(74) *Attorney, Agent, or Firm* — McCoy Russell LLP

(57) ABSTRACT

Systems are provided for a transmission system. In one example, a multi-speed transmission includes an input shaft comprising an input gear driven by two electric motors, a first clutch comprising a first clutch gear configured to rotate a first shaft on which a first synchronizer is arranged, wherein the first clutch is arranged on the input shaft, a second clutch comprising a second clutch gear configured to rotate a second shaft on which a second synchronizer is arranged, wherein the second clutch is arranged on the input shaft, an idler shaft comprising a plurality of gears in meshed engagement with gears of the first synchronizer and the second synchronizer, and an output shaft comprising an output gear in meshed engagement with a gear of the plurality of gears of the idler shaft.

20 Claims, 3 Drawing Sheets

(56)              References Cited

FOREIGN PATENT DOCUMENTS

| | | | | |
|---|---|---|---|---|
| EP | 1968812 | B1 | 12/2010 | |
| JP | 3082043 | B2 | 8/2000 | |
| JP | 2003301895 | A * | 10/2003 | ............. F16H 3/006 |
| JP | 2004069028 | A | 3/2004 | |
| JP | 2020008081 | A | 1/2020 | |
| KR | 101610506 | B1 | 4/2016 | |
| KR | 20200014571 | A | 2/2020 | |
| WO | WO-2009132628 | A1 * | 11/2009 | ............. F16H 3/006 |
| WO | 2020078596 | A1 | 4/2020 | |

* cited by examiner

SYSTEMS AND METHOD FOR AN ELECTRIC POWERTRAIN

CROSS REFERENCE TO RELATED APPLICATION

The present application claims priority to U.S. Provisional Application No. 63/519,492, entitled "SYSTEMS AND METHOD FOR AN ELECTRIC POWERTRAIN", and filed on Aug. 14, 2023. The entire contents of the above-listed application are hereby incorporated by reference for all purposes.

TECHNICAL FIELD

The present description relates generally to a transmission of a vehicle.

BACKGROUND AND SUMMARY

As the proliferation of vehicle electrification continues, changes to vehicle components are demanded to accommodate new vehicle architectures. For example, transmissions may need multiple gear trains to accommodate torque transfer from one or more electric motors. Packaging of a multi-gear train transmission may present certain challenges as packaging space available in vehicles continues to be reduced.

Thus, a demand for a transmission with multiple gear trains and a reduced packaging size is desired. In one example, the issues described above may be addressed by a multi-speed transmission including an input shaft comprising an input gear driven by two electric motors, a first clutch comprising a first clutch gear configured to rotate a first shaft on which a first synchronizer is arranged, wherein the first clutch is arranged on the input shaft, a second clutch comprising a second clutch gear configured to rotate a second shaft on which a second synchronizer is arranged, wherein the second clutch is arranged on the input shaft, an idler shaft comprising a plurality of gears in meshed engagement with gears of the first synchronizer and the second synchronizer, and an output shaft comprising an output gear in meshed engagement with a gear of the plurality of gears of the idler shaft.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The above, as well as other advantages of the present disclosure, will become readily apparent to those skilled in the art from the following detailed description when considered in light of the accompanying drawings in which.

DETAILED DESCRIPTION

Figure 1:
FIG. 1 is a schematic depiction of an example vehicle, according to an embodiment of the present disclosure.
Figure 2:
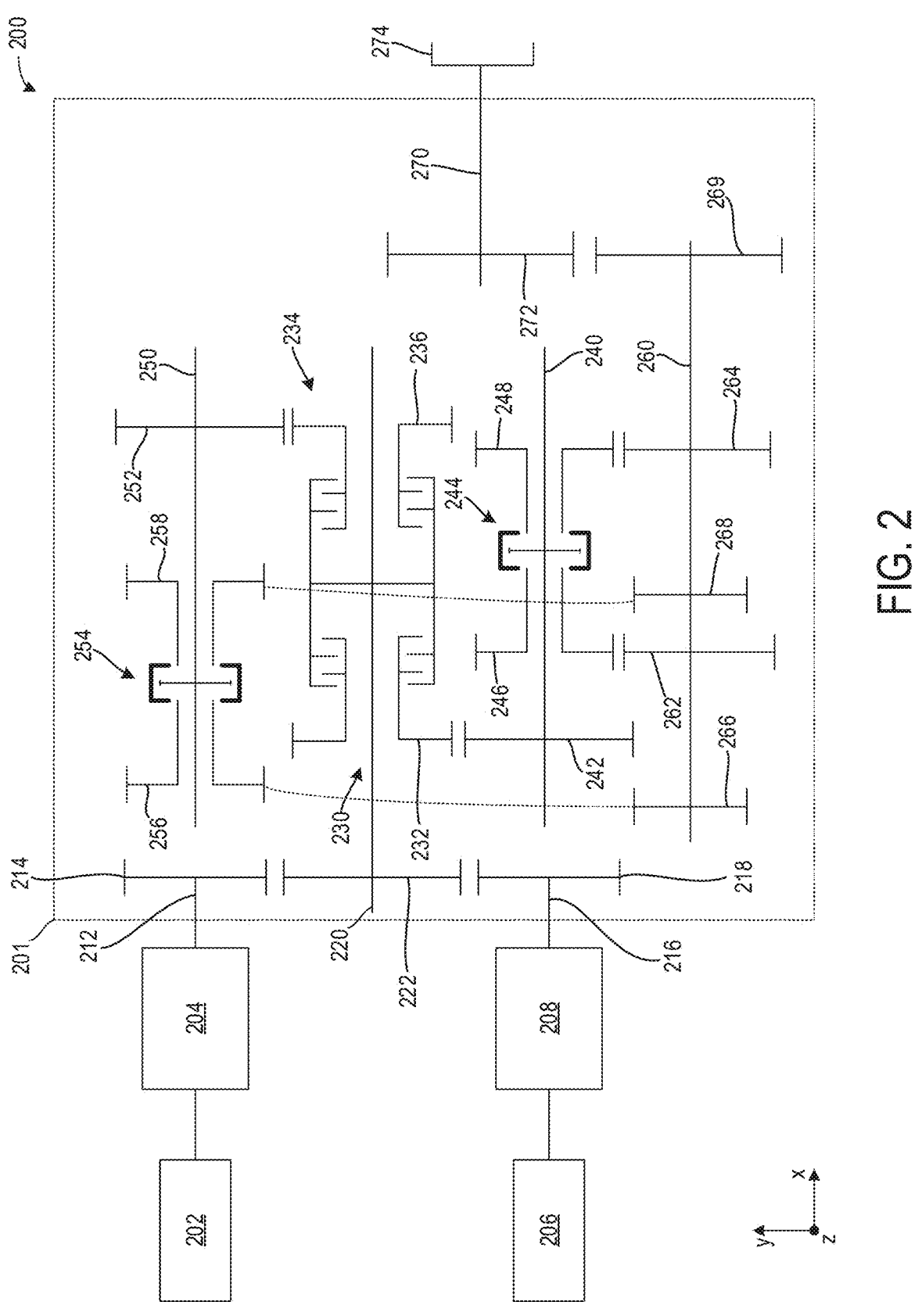
FIG. 2 is an embodiment of a transmission of the vehicle, according to an embodiment of the present disclosure.
Figure 3:
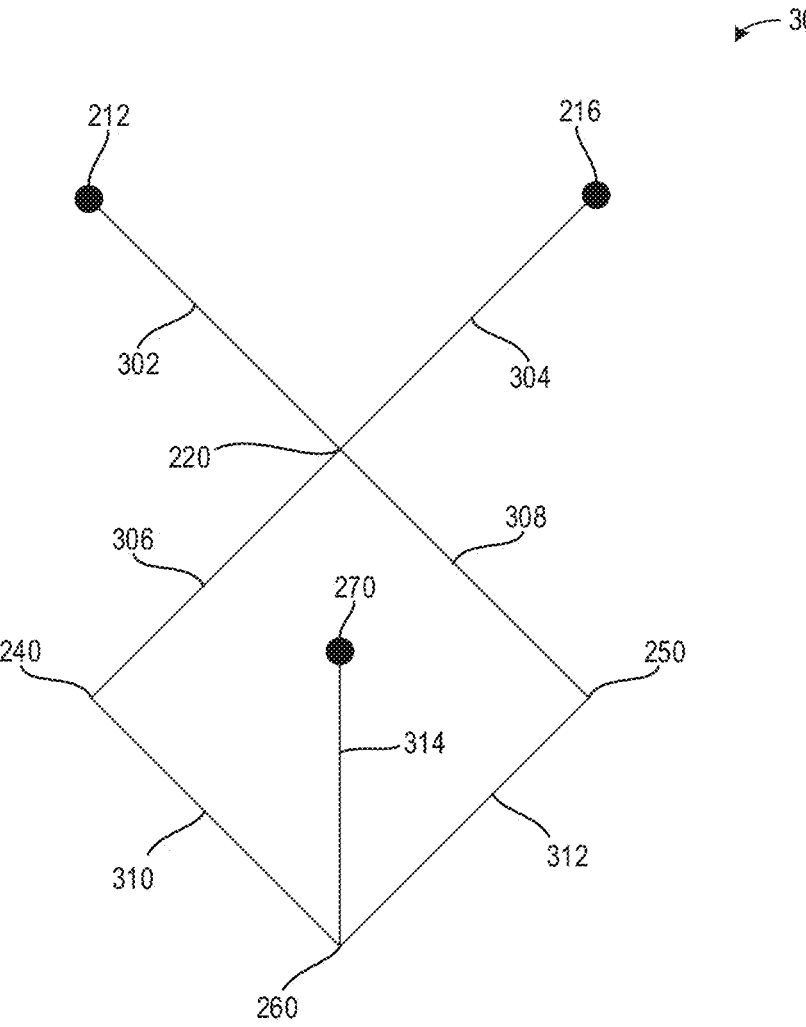
FIG. 3 is an embodiment of a layout of the transmission.
Figure 3:
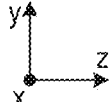

The following description relates to a transmission. In one example, the transmission is a multi-speed transmission, as shown in FIG. 1. FIG. 2 illustrates an embodiment of a transmission of the vehicle. FIG. 3 illustrates an embodiment of a layout of the transmission.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In one example, the disclosure provides support for a transmission coupled to at least one electric motor. In one example, two electric motors are configured to drive a counter shaft transmission with a double drum assembly. The transmission may be used in a vehicle. The vehicle may be a heavy-duty vehicle, a light-duty vehicle, an off-highway vehicle, or other vehicle. In some examples, it may be desired to execute a relatively high torque multiplication in first gear, such as 1:25. An input gear of the transmission may be configured to reduce the speed provided by the electric motors, which may decrease a speed differential across the clutches of the transmission. The input ratio and the output ratio of the transmission may limit a demanded reduction between the input shaft and the two clutch shafts comprising a total of four clutches, two clutches on each of the clutch shafts. As such, a size of the gears included in the transmission may be reduced, which may decrease a packaging size of the transmission. The double clutch arrangement may further decrease a number of gear engagements and increase efficiency of the system. The double clutch arrangement may increase a longevity of the transmission and decrease service requests. Additionally or alternatively, a centerline of the input and output shafts may be substantially parallel to one another. In one example, substantially parallel may be defined as two lines with primary vectors extending in a single direction.

The transmission may be a multi-speed transmission comprising a plurality of shafts, gears, and bearings. The configuration of the components of the transmission may allow four distinct speeds to be achieved.

Turning now to FIG. 1, a vehicle 100 is shown comprising a powertrain 101 and a drivetrain 103. The powertrain comprises a prime mover 106 and a transmission 108. The prime mover 106 may be an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting.

In one example, the prime mover 106 is a first prime mover 106 and the vehicle 100 may further include a second prime mover 107. The first prime mover 106 may be different than the second prime mover 107 in size and configuration. Each of the first prime mover 106 and the second prime mover 107 may be coupled to an energy storage device. The energy storage device may be a battery, a fuel tank, or other similar device. A charge of fuel volume of the energy storage device may be monitored via a sensor or estimated based on vehicle operating conditions. In one example, one or more of the first prime mover 106 and the second prime mover 107 may be configured to replenish a charge of the energy storage device during a generator operation.

In one example, the first prime mover 106 and the second prime mover 107 are electric machines coupled to an energy storage system including a plurality of battery cells. Inverters may be configured to control electrical power provided to corresponding electric machines. In this way, each of the first prime mover 106 and the second prime mover 107 is an electric machine.

The vehicle 100 may be a commercial vehicle, light, medium, or heavy duty vehicle, a passenger vehicle, an off-highway vehicle, and sport utility vehicle. Additionally or alternatively, the vehicle 100 and/or one or more of its components may be in industrial, locomotive, military, agricultural, and aerospace applications.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a front-wheel drive, a rear-wheel drive, or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing.

The vehicle 100 may further include a control system 184. Control system 184 is shown comprising a controller 182 receiving information from a plurality of sensors 186 and sending control signals to a plurality of actuators 188. The controller 182 may receive input data from the various sensors, process the input data, and trigger the actuators in response to the processed input data based on instruction or code programmed therein corresponding to one or more routines. The plurality of sensors 186 may include speed sensors, temperature sensors, humidity sensors, location sensors, accelerometers, and the like. The plurality of actuators 188 may be actuators of one more valves, motors, and other devices.

Turning now to FIG. 2, it shows a transmission assembly 200. The transmission assembly 200 may be included in vehicle 100 of FIG. 1. In one example, the transmission assembly 200 is a non-limiting example of the transmission 108 of FIG. 1. The transmission assembly 200 may be a counter shaft multi-speed transmission. In one example, the transmission assembly 200 is a two-speed transmission.

An axis system is shown comprising an x-axis, a y-axis normal to the x-axis, and a z-axis normal to each of the x- and y-axes. In one example, the x-axis is parallel to a horizontal direction, the y-axis is parallel to a vertical axis, and the z-axis is parallel to a transverse direction.

A first inverter 202 is electrically coupled to a first electric motor 204. A second inverter 206 is electrically coupled to a second electric motor 208. The first inverter 202 and the second inverter 206 may be configured to transfer power from an energy storage device to the first electric motor 204 and the second electric motor 208, respectively.

The first electric motor 204 may include a first electric motor output shaft 212 on which a first electric motor output gear 214 is arranged. The second electric motor 208 may include a second electric motor output shaft 216 on which a second electric motor output gear 218 is arranged. In one embodiment, the first electric motor 204 and the second electric motor 208 may be sized identically. In some examples, additionally or alternatively, the first electric motor 204 may be a different size than the second electric motor 208. In one example, the first electric motor output gear 214 is shaped and sized identically to the second electric motor output gear 218. In some examples, additionally or alternatively, the first electric motor output gear 214 is shaped and/or sized differently than the second electric motor output gear 218.

An input gear 222 may be arranged on an input shaft 220. The input gear 222 may be in meshed engagement with each of the first electric motor output gear 214 and the second electric motor output gear 218. In one example, each of the first electric motor output gear 214, the second electric motor output gear 218, and the input gear 222 are arranged within a transmission casing 201. A boundary of the transmission casing 201 is illustrated via a dashed box. As such, each of the first output shaft 212 and the second output shaft 216 may extend in a direction parallel to the x-axis and through a surface of the transmission casing 201 into an interior volume thereof.

The input gear 222 may rotate the input shaft 220. A first clutch 230 and a second clutch 234 may be arranged on the input shaft 220. Based on a position of the clutches, power may be transferred from the input shaft 220 to a respective gear of the first clutch 230 or the second clutch 234. For example, when the first clutch 230 is closed, power may transfer from the input shaft 220 to a first clutch gear 232. As another example, when the first clutch 230 is open, power from the input shaft 220 may not transfer to the first clutch gear 232. When the second clutch 234 is closed, power may transfer from the input shaft 220 to a second clutch gear 236. When the second clutch 234 is open, power may not transfer from the input shaft 220 to the second clutch 234. In one example, positions of the clutches may alternate such that when one clutch is open, the other clutch is closed. A size of the first clutch gear 232 may be identical to or different than a size of the second clutch gear 236.

The first clutch gear 232 may be in meshed engagement with a first gear 242 arranged on a first shaft 240. Teeth of the first clutch gear 232 may interlock with teeth of the first gear 242. When the first clutch gear 232 rotates due to the first clutch 230 being closed, then the first gear 242 may rotate via the first clutch gear and rotate the first shaft 240.

The second clutch gear 236 may be in meshed engaged with a second gear 252 arranged on a second shaft 250. Teeth of the second clutch gear 236 may interlock with teeth of the second gear 252. When the second clutch gear 236 rotates due to the second clutch 234 being closed, then the second gear 252 may rotate via the second clutch gear 236 and rotates the second shaft 250. In one example, the second shaft 250 is parallel to the first shaft 240.

The first shaft 240 may further include a first synchronizer 244. The first synchronizer 244 may include a first synchro gear 246 and a third synchro gear 248. The first synchronizer 244 may be configured to rotate the first synchro gear 246 or the third synchro gear 248 when the first shaft 240 is rotating. The first synchro gear 246 may be identical to or different than the third synchro gear 248 in size.

The second shaft 250 may further include a second synchronizer 254. The second synchronizer 254 may include a second synchro gear 256 and a fourth synchro gear 258. The second synchronizer 254 may be configured to rotate the second synchro gear 256 or the fourth synchro gear 258 when the second shaft 250 is rotating. The second synchro gear 256 may be identical to or different than the fourth synchro gear 258 in size.

The first synchro gear 246 and the third synchro gear 248 may be in meshed engagement via interlocked teeth with a first idler gear 262 and a third idler gear 264, respectively. The second synchro gear 256 and the fourth synchro gear 258 may be in meshed engagement via interlocked teeth with a second idler gear 266 and a fourth idler gear 268, respectively. Dashed lines illustrate the direct engagement between the second synchro gear 256 and the fourth synchro gear 258 and the second idler gear 266 and the fourth idler gear 268, respectively.

The first synchronizer 244 and the second synchronizer 254 may be configured to select one of the synchro gears with which to transfer power from the first shaft 240 or the second shaft 250, respectively, to the idler shaft 260. The synchronizers may obviate the demand for additional clutches such that the transmission 200 only includes the first clutch 230 and the second clutch 234. The synchronizers may be more efficient, smaller, and more durable than clutches with a similar function, thereby enhancing the transmission 200.

The first through fourth idler gears are arranged on an idler shaft 260. The idler shaft 260 may further include a fifth idler gear 269. In one example, the idler shaft 260 may rotate based on power from the first and third idler gears 262, 264 or the second and fourth idler gears 266, 268. When the idler shaft 260 rotates, it may rotate the fifth idler gear 269. The fifth idler gear 269 may be in meshed engagement with an output gear 272 arranged on an output shaft. The output gear 272 may rotate with the fifth idler gear 269, which may force the output shaft 270 to rotate.

An output member 274 may be arranged on the output shaft 270. The output member 274 may be arranged at an end of the output shaft 270 opposite to an end of the output shaft 270 at which the output gear 272 is arranged. In one example, the output member 274 is a second output gear coupled to a differential. In other examples, additionally or alternatively, the output member 274 is a flange coupled to a wheel.

In one example, the transmission of FIG. 2 may include different geartrains. A first geartrain may include the electric motor output gears and the input gear 222. The first geartrain may reduce an input speed provided to the components of the transmission 200. A second geartrain may include the second synchro gear 256 and the second idler gear 266. A third geartrain may include the first clutch gear 232 and the first gear 242. A fourth geartrain may include the first synchro gear 246 and the first idler gear 262. A fifth geartrain may include the fourth synchro gear 258 and the fourth idler gear 268. A sixth geartrain may include the second clutch gear 236 and the second gear 252. A seventh geartrain may include the third synchro gear 248 and the third idler gear 264. An eighth geartrain may include the fifth idler gear 269 and the output gear 272. The input ratio and the output ratio of the transmission 200 may reduce a size of the largest gears of a main section of the transmission 200. The main section may include the clutches and the synchronizes. As such, a packaging of the transmission 200 may be reduced relative to previous transmissions.

The configuration of the transmission 200, including the two clutches and the two synchronizers may reduce a number of clutches and increase an efficiency of the system. In one example, the transmission 200 may include at least two fewer clutches via inclusion of the two synchronizers. Additionally, the fifth idler gear 269 may be sized, shaped, and located to provide flexibility with regard to a location of the output member 274. If desired, a centerline of the output shaft 270 may in line with a centerline of the input shaft 220. Additionally or alternatively, the centerline of the output shaft 270 may be within a threshold angle of parallel to the centerline of the input shaft 220. For example, the threshold angle is 10 degrees when parallel is 0 degrees. In this way, the transmission 200 may be incorporated into a plurality of different vehicle configurations via the flexibility of the shape, size, and location of the fifth idler gear 269.

The transmission 200 may include four distinct gears of operation. A first gear operation may include closing the first clutch 230, opening the second clutch 234, and engaging the first synchro gear 246 with the first idler gear 262 with the first synchronizer 244. A second gear operation may include closing the second clutch 234, opening the first clutch 230, and engaging the second synchro gear 256 with the second idler gear 266. A third gear operation may include closing the first clutch 230, opening the second clutch 234, and engaging the third synchro gear 248 with the third idler gear 264 with the first synchronizer 244. A fourth gear operation may include closing the second clutch 234, opening the first clutch 230, and engaging the fourth synchro gear 258 with the fourth idler gear 268.

In an example operation of the transmission, as it shifts from the first gear operation to the second gear operation, the first clutch is opened and the second clutch is closed. The second synchro gear is coupled to the second idler gear via the second synchronizer. As the transmission shifts from the second gear operation to the third gear operation, the first clutch is closed and the second clutch is opened. The third synchro gear is coupled to the third idler gear via the first synchronizer. As the transmission shifts from the third gear operation to the fourth gear operation, the first clutch is opened and the second clutch is closed. The fourth synchro gear is coupled to the fourth idler gear via the second synchronizer. The opposite sequence may be used as the vehicle downshifts. As such, the transmission 200 may be a four speed transmission.

Turning now to FIG. 3, it shows an example layout 300 of the transmission 200. As illustrated in the layout 300, the first output shaft 212, the second output shaft 216, and the output shaft 270 are parallel to the x-axis. In one example, additionally or alternatively, the first output shaft 212, the second output shaft 216, and the output shaft 270 may include a vector that extends parallel to the x-axis.

The example layout 300 illustrates gear interactions via lines and shafts at intersections between the lines. Angles of the lines may be representative of the angles of the gears in the arrangement of the transmission 200 on a vehicle. Line 302 illustrates an interaction between the first electric motor output gear 214 and the input gear 222. Line 304 illustrates an interaction between the second electric motor output gear 218 and the input gear 222. Line 306 illustrates an interaction between the first clutch gear 232 and the first gear 242 of the first shaft 240. Line 308 illustrates an interaction between the second clutch gear 236 and the second gear 252 of the second shaft. Line 310 illustrates an interaction the first synchro gear 246 or the third synchro gear 248 and the first idler gear 262 or the third idler gear 264. Line 312 illustrates an interaction between the second synchro gear 256 or the fourth synchro gear 258 and the second idler gear 266 or the fourth idler gear 268. Line 314 illustrates an interaction between the fifth idler gear 269 and the output gear 272. As illustrated, each of the first input shaft 212, the second input shaft 216, the input shaft 220, and the output shaft 270 may be substantially parallel to the x-axis, wherein substantially parallel includes where the shafts are within 5 degrees of the x-axis. In one example, the input shaft 220, the first shaft 240, the second shaft 250, and the idler shaft 260 are arranged in a square or a diamond shape.

The disclosure also provides support for a multi-speed transmission, comprising: an input shaft comprising an input gear driven by two electric motors, a first clutch comprising a first clutch gear configured to rotate a first shaft on which a first synchronizer is arranged, wherein the first clutch is arranged on the input shaft, a second clutch comprising a second clutch gear configured to rotate a second shaft on which a second synchronizer is arranged, wherein the second clutch is arranged on the input shaft, an idler shaft comprising a plurality of gears in meshed engagement with gears of the first synchronizer and the second synchronizer, and an output shaft comprising an output gear in meshed engagement with a gear of the idler shaft. In a first example of the system, the output shaft comprises a primary vector that is parallel to primary vectors of shafts extending from the two electric motors to the input shaft. In a second example of the system, optionally including the first example, the first synchronizer comprises a first synchro gear and a third synchro gear arranged on the first shaft. In a third example of the system, optionally including one or both of the first and second examples, the second synchronizer comprises a second synchro gear and a fourth synchro gear arranged on the second shaft. In a fourth example of the system, optionally including one or more or each of the first through third examples, the electric motors output power to the input gear via a first electric motor output gear and a second electric motor output gear. In a fifth example of the system, optionally including one or more or each of the first through fourth examples, the multi-speed transmission is a counter shaft multi-speed transmission. In a sixth example of the system, optionally including one or more or each of the first through fifth examples, the multi-speed transmission is a four-speed transmission.

The disclosure also provides support for a system, comprising: a multi-speed transmission arranged in a housing, the multi-speed transmission, comprising, an input shaft comprising an input gear driven by two electric motors, a first clutch comprising a first clutch gear configured to rotate a first shaft on which a first synchronizer is arranged, wherein the first clutch is arranged on the input shaft, a second clutch comprising a second clutch gear configured to rotate a second shaft on which a second synchronizer is arranged, wherein the second clutch is arranged on the input shaft, an idler shaft comprising a plurality of gears in meshed engagement with gears of the first synchronizer and the second synchronizer, and an output shaft comprising an output gear in meshed engagement with a gear of the idler shaft. In a first example of the system, the first clutch gear is meshed with a first gear of the first shaft. In a second example of the system, optionally including the first example, the second clutch gear is meshed with a second gear of the second shaft. In a third example of the system, optionally including one or both of the first and second examples, the input shaft, the first shaft, the second shaft, the idler shaft, and the output shaft are parallel to one another. In a fourth example of the system, optionally including one or more or each of the first through third examples, the input gear is driven by one or more of a first electric motor output gear and a second electric motor output gear. In a fifth example of the system, optionally including one or more or each of the first through fourth examples, the first electric motor output gear is arranged on a first electric motor shaft and the second electric motor output gear is arranged on a second electric motor shaft, wherein the first electric motor shaft and the second electric motor shaft are parallel to each of the input shaft, the first shaft, the second shaft, the idler shaft, and the output shaft. In a sixth example of the system, optionally including one or more or each of the first through fifth examples, the first synchronizer comprises a first synchronizer gear and a third synchronizer gear, and wherein the second synchronizer comprises a second synchronizer gear and a fourth synchronizer gear. In a seventh example of the system, optionally including one or more or each of the first through sixth examples, the plurality of gears comprises a first idler gear engaged with the first synchronizer gear, a second idler gear engaged with the third synchronizer gear, a third idler gear engaged with the second synchronizer gear, and a fourth idler gear engaged with the fourth synchronizer gear.

The disclosure also provides support for a system, comprising: a first electric motor comprising a first electric motor shaft on which a first electric motor output gear is arranged, a second electric motor comprising a second electric motor shaft on which a second electric motor output gear is arranged, a multi-speed transmission arranged in a housing, the multi-speed transmission, comprising, an input shaft comprising an input gear driven by one or more of the first electric motor output gear and the second electric motor output gear, a first clutch comprising a first clutch gear configured to rotate a first shaft on which a first synchronizer is arranged, wherein the first clutch is arranged on the input shaft, a second clutch comprising a second clutch gear configured to rotate a second shaft on which a second synchronizer is arranged, wherein the second clutch is arranged on the input shaft, an idler shaft comprising a plurality of gears in meshed engagement with gears of the first synchronizer and the second synchronizer, and an output shaft comprising an output gear in meshed engagement with a gear of the idler shaft. In a first example of the system, the first electric motor shaft, the second electric motor shaft, the input shaft, the first shaft, the second shaft, the idler shaft, and the output shaft are parallel to one another. In a second example of the system, optionally including the first example, the input shaft, the first shaft, the second shaft, and the idler shaft are arranged in a square shape. In a third example of the system, optionally including one or both of the first and second examples, the first electric motor shaft, the second electric motor shaft, and the output shaft are the only shafts the extend outside of the housing. In a fourth example of the system, optionally including one or more or each of the first through third examples, the output shaft is coupled to an output member arranged outside of the housing.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A multi-speed transmission, comprising:
an input shaft comprising an input gear driven by two electric motors;
a first clutch comprising a first clutch gear configured to rotate a first shaft on which a first synchronizer is arranged, wherein the first clutch is arranged on the input shaft;
a second clutch comprising a second clutch gear configured to rotate a second shaft on which a second synchronizer is arranged, wherein the second clutch is arranged on the input shaft;
an idler shaft comprising a plurality of gears in meshed engagement with gears of the first synchronizer and the second synchronizer, wherein the input shaft, the first shaft, the second shaft, and the idler shaft are arranged in a square or a diamond shape such that the input shaft is positioned vertically above the idler shaft; and an output shaft comprising an output gear in meshed engagement with a gear of the idler shaft.

2. The multi-speed transmission of claim 1, wherein the output shaft comprises a primary vector that is parallel to primary vectors of shafts extending from the two electric motors to the input shaft.

3. The multi-speed transmission of claim 1, wherein the first synchronizer comprises a first synchro gear and a third synchro gear arranged on the first shaft.

4. The multi-speed transmission of claim 3, wherein the second synchronizer comprises a second synchro gear and a fourth synchro gear arranged on the second shaft.

5. The multi-speed transmission of claim 1, wherein the two electric motors output power to the input gear via a first electric motor output gear and a second electric motor output gear.

6. The multi-speed transmission of claim 1, wherein the multi-speed transmission is a counter shaft multi-speed transmission.

7. The multi-speed transmission of claim 1, wherein the multi-speed transmission is a four-speed transmission.

8. A system, comprising:
a multi-speed transmission arranged in a housing, the multi-speed transmission, comprising:
an input shaft comprising an input gear driven by two electric motors;
a first clutch comprising a first clutch gear configured to rotate a first shaft on which a first synchronizer is arranged, wherein the first clutch is arranged on the input shaft;
a second clutch comprising a second clutch gear configured to rotate a second shaft on which a second synchronizer is arranged, wherein the second clutch is arranged on the input shaft;
an idler shaft comprising a plurality of gears, each in meshed engagement with a gear of either the first synchronizer or the second synchronizer; and
an output shaft comprising an output gear in meshed engagement with a gear of the idler shaft.

9. The system of claim 8, wherein the first clutch gear is meshed with a first gear of the first shaft.

10. The system of claim 8, wherein the second clutch gear is meshed with a second gear of the second shaft.

11. The system of claim 8, wherein the input shaft, the first shaft, the second shaft, the idler shaft, and the output shaft are parallel to one another.

12. The system of claim 8, wherein the input gear is driven by one or more of a first electric motor output gear and a second electric motor output gear.

13. The system of claim 12, wherein the first electric motor output gear is arranged on a first electric motor shaft and the second electric motor output gear is arranged on a second electric motor shaft, wherein the first electric motor shaft and the second electric motor shaft are parallel to each of the input shaft, the first shaft, the second shaft, the idler shaft, and the output shaft.

14. The system of claim 8, wherein the first synchronizer comprises a first synchronizer gear and a third synchronizer gear, and wherein the second synchronizer comprises a second synchronizer gear and a fourth synchronizer gear.

15. The system of claim 14, wherein the plurality of gears comprises a first idler gear engaged with the first synchronizer gear, a second idler gear engaged with the third synchronizer gear, a third idler gear engaged with the second synchronizer gear, and a fourth idler gear engaged with the fourth synchronizer gear.

16. A system, comprising:

a first electric motor comprising a first electric motor shaft on which a first electric motor output gear is arranged;

a second electric motor comprising a second electric motor shaft on which a second electric motor output gear is arranged;

a multi-speed transmission arranged in a housing, the multi-speed transmission, comprising:

an input shaft comprising an input gear driven by one or more of the first electric motor output gear and the second electric motor output gear;

a first clutch comprising a first clutch gear configured to rotate a first shaft on which a first synchronizer is arranged, wherein the first clutch is arranged on the input shaft;

a second clutch comprising a second clutch gear configured to rotate a second shaft on which a second synchronizer is arranged, wherein the second clutch is arranged on the input shaft;

an idler shaft comprising a plurality of gears, each in meshed engagement with a gear of either the first synchronizer or the second synchronizer, wherein input shaft is positioned vertically above the idler shaft; and an output shaft comprising an output gear in meshed engagement with a gear of the idler shaft.

17. The system of claim 16, wherein the first electric motor shaft, the second electric motor shaft, the input shaft, the first shaft, the second shaft, the idler shaft, and the output shaft are parallel to one another.

18. The system of claim 16, wherein the input shaft, the first shaft, the second shaft, and the idler shaft are arranged in a square shape.

19. The system of claim 16, wherein the first electric motor shaft, the second electric motor shaft, and the output shaft are the only shafts the extend outside of the housing.

20. The system of claim 16, wherein the output shaft is coupled to an output member arranged outside of the housing.

* * * * *